(12) United States Patent
Bottura et al.

(10) Patent No.: US 9,365,758 B2
(45) Date of Patent: Jun. 14, 2016

(54) BIODEGRADABLE ORGANIC PRODUCT DESIGNED FOR PRODUCING A ROAD SNOW MELTING AGENT

(71) Applicants: Francesco Bottura, Nyon (CH); Hicham Ferhout, Toulouse (FR); Florent Marc Andre Theotiste, Bourges (FR)

(72) Inventors: Francesco Bottura, Nyon (CH); Hicham Ferhout, Toulouse (FR); Florent Marc Andre Theotiste, Bourges (FR)

( * ) Notice: Subject to any disclaimer, the term of this patent is extended or adjusted under 35 U.S.C. 154(b) by 0 days.

(21) Appl. No.: 14/206,763

(22) Filed: Mar. 12, 2014

(65) Prior Publication Data

US 2014/0264149 A1  Sep. 18, 2014

Related U.S. Application Data

(63) Continuation of application No. PCT/IB2012/054739, filed on Sep. 12, 2012.

(51) Int. Cl.
| | |
|---|---|
| *C09K 3/18* | (2006.01) |
| *C05D 1/02* | (2006.01) |
| *C05D 3/00* | (2006.01) |
| *C05G 3/00* | (2006.01) |

(52) U.S. Cl.
CPC . *C09K 3/185* (2013.01); *C05D 1/02* (2013.01); *C05D 3/00* (2013.01); *C05G 3/0052* (2013.01)

(58) Field of Classification Search
CPC .................................. C09K 3/18; C09K 3/185
USPC ............................................. 252/70; 106/13
See application file for complete search history.

(56) References Cited

U.S. PATENT DOCUMENTS

| | | | | |
|---|---|---|---|---|
| 4,430,240 | A | * | 2/1984 | Sandvig et al. ............... 252/70 |
| 4,664,832 | A | * | 5/1987 | Sandvig et al. ............... 252/70 |
| 4,692,259 | A | * | 9/1987 | Roman ......................... 252/70 |
| 5,132,035 | A | * | 7/1992 | Hoenke et al. ................ 252/70 |
| 5,635,101 | A | * | 6/1997 | Janke et al. ................... 252/70 |
| 5,709,813 | A | * | 1/1998 | Janke et al. ................... 252/70 |
| 5,932,135 | A | * | 8/1999 | Janke et al. ................... 252/70 |
| 5,965,058 | A | * | 10/1999 | Janke et al. ................... 252/70 |
| 6,156,227 | A | * | 12/2000 | Koefod ......................... 252/70 |
| 6,350,719 | B1 | * | 2/2002 | Kroll et al. .................... 504/103 |
| 7,135,126 | B2 | * | 11/2006 | Hartley et al. ................. 252/70 |
| 2010/0227168 | A1 | | 9/2010 | Turtschy et al. |

FOREIGN PATENT DOCUMENTS

| | | | | |
|---|---|---|---|---|
| CN | 1434094 | A | * 8/2003 | ............ C09K 3/18 |
| EP | 1 958 998 | A | 8/2008 | |
| GB | 915450 | | 1/1963 | |
| SE | 9504184 | A | 6/1996 | |

OTHER PUBLICATIONS

International Search Report prepared by the European Patent Office, in their capacity as the ISA, for parent application PCT/IB2012/054739 dated Dec. 13, 2012 with partial English translation.

Written Opinion of the International Searching Authority, prepared by the European Patent Office, in their capacity as the ISA, for parent application PCT/IB2012/054739 not dated with English translation.

* cited by examiner

*Primary Examiner* — Anthony J Green

(74) *Attorney, Agent, or Firm* — Frommer Lawrence & Haug LLP

(57) ABSTRACT

The present invention relates to a completely biodegradable organic product designed for producing a road snow melting/ground thawing agent or a biological agricultural fertilizer, comprising at least one salt, for example in the form of grit, brine or slurry, characterized in that it further comprises a material of plant origin consisting of at least one waste product from an oil pressing/extracting, winemaking or crushing process.

9 Claims, No Drawings

BIODEGRADABLE ORGANIC PRODUCT DESIGNED FOR PRODUCING A ROAD SNOW MELTING AGENT

This application is a continuation of International Application PCT/IB2012/054739 filed Sep. 12, 2012 which claims priority benefits to French Patent Application 11/58069 filed Sep. 11, 2011, the disclosures of which are both incorporated herein by reference.

The present invention concerns a road de-icing product to melt ice and snow.

The challenge of maintaining driving conditions and road accessibility in snow/icy weather is a most important issue in numerous countries, in particular in France. It is increasingly found that winter weather conditions are harsher, leading to particularly difficult situations to manage from both a human and technical viewpoint for users and personnel in charge of maintaining the viability of the road network. Snowed or icy roads can cause major human harm and damage to equipment, generating hundreds or thousands of lost work hours for companies, blocking all or part of a roadway possibly leading to paralysis of greater or lesser extent of the road network and to emergency situations of increasingly more frequent occurrence despite comprehensive planning for the prevention thereof.

Solutions for clearing snow from roads have long been used. Aside from mechanical means applied such has snow ploughs, in addition or as a replacement chemical solutions also exist to cause melting of snow or ice.

For this purpose, it is frequent to use what is known as a road de-icing salt which, through its composition, can lower the freezing point of water. For a given quantity of de-icer, the amount of melted ice/snow decreases with the lowering of the temperature of the mixture. The longer and the higher the temperature that can be maintained the better the efficiency of the de-icer. However, at a certain temperature called eutectic temperature, a saline solution can no longer be formed and melting ceases to occur.

The eutectic concentration reflects the required quality of de-icer to lower the freezing point to eutectic temperature. At this temperature melting is very slow. However if the de-icer contains too high a concentration of salt, in particular if the eutectic concentration is exceeded, the crystals are precipitated without lowering the freezing temperature. Therefore if the quantity of salt used is too high, this amounts to wastage, is not ecological for the land or water courses (re-treating difficult) and reduces the efficacy of ice melting by chemical action.

The heat needed to cause melting of ice/snow derives both from ambient air and from the substrate, chiefly the carriageway and hard shoulder. When a de-icer is first added to ice/snow, the elimination of the heat required to melt the ice/snow lowers the temperature of the ice/snow and water mixture until it is equal to that of the saline concentration. However as and when the ice/snow melt, the concentration of salt is reduced and the equilibrium temperature increases. It therefore follows that the melting of ice/snow by adding a de-icer leads to initial lowering of the temperature followed by a gradual increase in temperature as and when the ice/snow melt.

Most road de-icing salts contain sodium, calcium or magnesium chloride, or mixtures thereof. Sodium[1] chloride is the most frequently use de-icing salt. It is formed (in weight % of the total weight) of about 40% sodium and 60% chlorine. Calcium chloride is the second most used de-icing salt and comprises (in weight % of the total weight) about 36% of calcium and 64% chlorine. Finally, magnesium chloride is also used and contains (in weight % of the total weight) 26% magnesium and 74% chlorine.

[1] NdT from the context and not from sodium calcium

Additives such as anti-caking agents or anti-agglomerating agents can be used to prevent clumping. Most often the agent used is sodium, potassium or calcium hexacyanoferrate.

There are also alternative or supplementary solutions having recourse to grit, or wood shavings such as described in US 2010227168.

These products, which are not road de-icers properly so-called, chiefly act via the principle of making the roadway a little more abrasive so that vehicles can continue to travel at slow speed, the flow of traffic therefore travelling in general on packed ice or snow.

However, all the cited solutions do not give full satisfaction.

In cold regions where they are used frequently and in abundance, road de-icing salts affect the environment by making it saline. This, in particular, is cause of the decline or local disappearance of salmon or of some amphibians in Canada leading to an ecological imbalance.

Salt can also affect trees, which capture and accumulate the salt via their roots. Over and above a certain level, a tree dies or becomes non-productive. Wildfires or fireplace fires when burning word impregnated with de-icers are a potential source of intoxication.

These saline de-icers are also known to cause considerable damage to roads, vehicles, network equipment for the treatment of rainwater, etc.

On account of their action, de-icers often convey heavy metals (lead, zinc, aluminium, cadmium, nickel, sodium, mercury, iron, chromium or copper) present on roadways and derived from wear of tyres, brake linings, bodywork or other corroded roadway equipment. This dispersion of hazardous products which contributes to ground pollution via natural surface run-off during thawing is not tolerable.

Grit and wood shavings have the disadvantage of being particularly difficult to remove, from roadways in that a large amount of matter subsists which may clog drains. The removal of these residues is therefore tedious and difficult and requires the use of men and machinery.

Regarding grit more specifically, studies conducted on these techniques show that the total primary energy consumed for the manufacture of grit and dispersion thereof on the road network is three times higher in comparison with the energy consumed for the production and spreading of salts. The advantage in chemical terms of grit or wood shavings over de-icing salts is therefore strongly limited by high energy costs and highly restrictive conditions for removal of residues.

Therefore, any chemical means for melting ice/snow has to be efficient i.e. it must act as quickly as possible so that the road network is accessible within a short period of time but also for a long length of time so that it does not again become impassable through ice/snow.

In addition, the issue of production costs, implementation, removal treatment of the chemical means used must be taken into account to minimise the financial impact for local councils and hence local rates. For example, some roads are quite simply not cleared of snow for lack of time or money since other sections of the road network are considered more important regarding traffic and use of finances. This may have various consequences on public services (schools), health (poor driving conditions for doctors, ambulances or nurses) or more globally on the economy.

To this are added practical problems of supply (quantity, cost, transport, storage, year-to-year forecasting, risk of shortage) and the spreading of de-icing agents (quantity and condition of available equipment, human needs, choice of best time for spreading). To summarise, it must be sought to meet everyone's needs.

Finally, the de-icing product used has to be ecological and have the least possible impact on the environment (water, land, plants, aquatic ecosystems) to prevent any risk of ground pollution, pollution of groundwater, plants, animals, etc.

At the current time it can only be ascertained that none of the solutions meets the required criteria.

It is therefore one objective of the present invention to solve the afore-cited problems by means of a solution that is simple to produce, low-cost, easy to use and optimised in terms of efficacy.

Therefore the subject of the present invention is a fully biodegradable organic product intended for the manufacture of a road snow melting/ground thawing agent or biological agricultural fertiliser containing at least one salt e.g. in granular, brine or slurry form, characterized in that it further contains a material of plant origin formed of at least one waste derived from oil pressing/extraction, vinification or crushing processes.

According to preferred embodiments, the device conforming to the present invention comprises at least one of the following characteristics:
- the material of plant origin is extracted by pressing/extraction from at least one protein oilseed such as sunflower seed, rapeseed or grape seeds;
- the material of plant origin is formed of grape seeds and/or grape pulp;
- the material of plant origin is formed of waste from crushed wood or corn stalks;
- the salt is calcium potassium, magnesium or sodium chloride, or any mixture thereof;
- the salt content of the product is about 20 and 50%;
- the product is in compact granular, pellet, rod or flake form having a relative humidity of less than 10%, preferably in the order of 5 to 6%;
- its particle size is between about 0.5 and 3 mm for granules, in the order of 1 to 5 mm for pellets, larger than approximately 10 mm for rods and substantially 30 mm or larger for flakes;
- the product further contains a binder of natural origin reducing or preventing its disintegration, in particular stillage, molasses or any other biodegradable natural binder.

The invention also concerns a method for producing a fully biodegradable organic product intended for the manufacture of a road snow melting/ground thawing agent or biological agricultural fertiliser, characterized in that it consists of mixing a material of plant origin with a salt e.g. in granular, brine or slurry form, the material of plant origin being formed of at least one waste product from oil pressing/extraction, vinification or crushing processes.

Advantageously, the method comprises a pressing/extracting step from at least one protein oilseed such as sunflower seed, rapeseed or grape seeds to form the material of plant origin, or a step to recover grape seeds and/or grape pulp to form the material of plant origin, or a step to crush wood or corn stalks to form the material of plant origin.

According to one preferred embodiment, the method comprises the following steps of:
- moistening the plant material with a first determined percentage of magnesium, potassium and/or calcium chloride brine;
- homogenising the mixture in a ploughshare mixer for a first determined time;
- adding to the homogenised mixture a second determined percentage of magnesium, potassium and/or calcium chloride in powder and/or granular form;
- further homogenising the mixture in the ploughshare mixer for a second determined time;
- transferring the pre-mix into a tube granulator, die or heat press for a third determined time; and
- drying the granules, pellets, rods or flakes thus obtained in the region of a determined temperature for a fourth determined time until a determined relative humidity of less than 10% is obtained.

In particular the first determined, percentage is about 20 to 30, the first determined time is about 1 to 3 hours, the second determined percentage is about 10 to 20%, the second determined time is about 1 to 2 hours, the third determined time is about 1 to 2 hours, the determined temperature is about 250° C. and the fourth determined time is about 30 mn to 2 hours, and the relative humidity is about 5 to 6%.

Ideally, the particle size obtained is about 0.5 to 3 mm for granules, about 1 to 5 mm for pellets, about 10 mm or larger for rods and about 30 mm or larger for flakes.

Finally, the method may further comprise a step for mixing with an anti-disintegration binding material such as stillage, molasses or any other biodegradable natural binder.

Therefore, the present invention allows a 20 to 50% reduction in the amount of salt used each season to clear snow, whilst showing better performance.

The lifetime of the product also allows savings in additional spreading operations. Studies show that in the event of further snowfalls or re-freezing, the product of the present invention remains efficient and continues its melting action so that the applying of additional product is not necessary or minimal. The product has a persistence of more than four weeks given the granular shape and composition which releases only the strictly necessary amount of salt to reach eutectic temperature and optimise melting. The remainder of the salt contained in the granules is retained so that it can subsequently be released in relation to future needs. The possible forming of black ice is also delayed. The preventive effect is lengthened compared with current de-icing salts irrespective of poor weather conditions.

This therefore makes it possible not only to obtain savings in terms of product to be manufactured/stored but also in terms of man- and machine-time. Lesser use of spreading vehicles particularly allows a notable reduction in maintenance costs.

In addition, since a smaller quantity is needed to melt one same iced area, the ecological impact is further reduced. Also, there is no problem of accumulation as encountered with wood shavings or grit when used alone, which generates savings in collection thereof at the end of the winter in addition to savings in spreading operations throughout the cold period. The composition of the product does not damage fragile materials and prevents corrosion on account of the lower salt content than in prior art de-icers.

The efficacy of the product of the present invention is ensured by continuous, effective exothermal reaction allowing rapid melting of snow and ice through strong heat release. Depending on the chosen dosages of the different constituent components of the de-icer, and under optimal conditions, the rise in temperature may be at least twice higher than with a conventional de-icing agent.

The natural colour of the product is also a visual indicator allowing ideal spreading and optimised melt quality by spreading the optimal amount of de-icer, neither too much nor too little.

From a safety viewpoint, its granular shape and composition provide a natural anti-skid surface that is safe also for pedestrians and light vehicles.

The use of the aforementioned biodegradable residues of natural origin e.g. grape seeds or waste corn stalks, also allows increased road adherence for vehicles, without the product being harsh on tyres or surfaces.

The product can also be used as fully biodegradable biological fertiliser which farmers can apply to their land. On account of its composition it provides minerals and forms a protection for the soil against some external attacks.

The detailed description of the subject of the invention given solely for illustration purposes is evidently in no way limiting, technical equivalents also being included in the scope of the present invention.

The invention claimed is:

1. An at least partially biodegradable road snow melting/ground thawing product, comprising at least one salt in a form selected from the group consisting of granular, brine and slurry forms, and further comprising a material of plant origin selected from the group consisting of waste vegetal by-products from oil pressing/extraction, vinification and plant material crushing processes, wherein the salt content of said melting/thawing product is at least 20% and less than 50%, wherein the material of plant origin is formed of grape seeds and/or grape pulp.

2. An at least partially biodegradable road snow melting/ground thawing product, comprising at least one salt in a form selected from the group consisting of granular, brine and slurry forms, and further comprising a material of plant origin selected from the group consisting of waste vegetal by-products from oil pressing/extraction and plant material crushing processes, wherein the salt content of said melting/thawing product is at least 20% and less than 50%, wherein the material of plant origin is formed of corn stalk waste.

3. An at least partially biodegradable road snow melting/ground thawing product, comprising at least one salt in a form selected from the group consisting of granular, brine and slurry forms, and further comprising a material of plant origin selected from the group consisting of waste vegetal by-products from oil pressing/extraction, vinification and plant material crushing processes, wherein the salt content of said melting/thawing product is at least 20% and less than 50%, wherein the product further contains a binding material of natural origin reducing or preventing the disintegration thereof, wherein said binding material is selected from the group consisting of stillage and molasses.

4. A method for producing an at least partially biodegradable road snow melting/ground thawing product, comprising the step of mixing a material of plant origin formed of at least one waste vegetal by-product from a process selected from oil pressing/extraction, vinification and crushing processes, with at least one salt in a form selected from the group consisting of granular, brine and slurry forms, wherein the salt content of said melting/thawing product is at least 20% and less than 50%, comprising a step of recovering grape seeds and/or pulp to form the material of plant origin.

5. A method for producing an at least partially biodegradable road snow melting/ground thawing product, comprising the step of mixing a material of plant origin formed of at least one waste vegetal by-product from a process selected from oil pressing/extraction and crushing processes, with at least one salt in a form selected from the group consisting of granular, brine and slurry forms, wherein the salt content of said melting/thawing product is at least 20% and less than 50%, comprising a step of crushing corn stalks to form the material of plant origin.

6. A method for producing an at least partially biodegradable road snow melting/ground thawing product, comprising the step of mixing a material of plant origin formed of at least one waste vegetal by-product from a process selected from oil pressing/extraction, vinification and crushing processes, with at least one salt in a form selected from the group consisting of granular, brine and slurry forms, wherein the salt content of said melting/thawing product is at least 20% and less than 50%, the method comprising the following steps of:
   moistening the plant material with a first percentage of a chloride selected from the group consisting of sodium, magnesium, potassium and calcium chloride brine;
   homogenising the mixture in a ploughshare mixer for a first time;
   adding to the homogenised mixture a second percentage of a chloride selected from the group consisting of sodium, magnesium, potassium and calcium chloride in powder and/or granular form;
   further homogenising the mixture in the ploughshare mixer for a second time;
   transferring the obtained mixture to a shaping device selected from the group consisting of tube granulators, die and heat presses for a third time; and
   drying the granules, pellets, rods or flakes thus obtained at a drying temperature for a fourth time until a relative humidity is obtained of less than 10%.

7. The method according to claim 6, wherein:
   the first percentage is about 20 to 30%;
   the first time is about 1 to 3 hours;
   the second percentage is about 10 to 20%;
   the second time is about 1 to 2 hours;
   the third time is about 1 to 2 hours;
   the drying temperature is about 250° C. and the fourth time is about 30 minutes to 2 hours;
   the relative humidity is about 5 to 6%.

8. The method according to claim 7, wherein the particle size of the said product is adjusted to about 0.5 to 3 mm for granules, about 1 to 5 mm for pellets, about 10 mm or greater for rods and about 30 mm or greater for flakes.

9. A method for producing an at least partially biodegradable road snow melting/ground thawing product, comprising the step of mixing a material of plant origin formed of at least one waste vegetal by-product from a process selected from oil pressing/extraction, vinification and crushing processes, with at least one salt in a form selected from the group consisting of granular, brine and slurry forms, wherein the salt content of said melting/thawing product is at least 20% and less than 50% and comprising the step of shaping the mixture of said salt and said material of plant origin into a shape selected from the group consisting of granules, pellets, rods and flakes, the method further comprises a mixing step with an anti-disintegration binding material selected from the group consisting of stillage and molasses.

* * * * *